United States Patent [19]
Watanabe et al.

[11] Patent Number: 4,515,709
[45] Date of Patent: May 7, 1985

[54] TERNARY INTERCALATION COMPOUND OF A GRAPHITE WITH AN ALKALI METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

[75] Inventors: Nobuatsu Watanabe; Tsuyoshi Nakajima, both of Kyoto; Masayuki Kawaguchi, Wakayama, all of Japan

[73] Assignee: Central Glass Co., Ltd., Ube, Japan

[21] Appl. No.: 474,202

[22] Filed: Mar. 9, 1983

[30] Foreign Application Priority Data

Sep. 10, 1982 [JP] Japan .................................. 57-156600

[51] Int. Cl.³ .............................................. H01B 1/06
[52] U.S. Cl. .................................. 252/509; 252/502; 252/506; 260/665 G; 260/665 R
[58] Field of Search ................... 252/502, 506, 509; 423/472, 414, 592, 593, 448, 463; 260/665 G, 665 R

[56] References Cited

U.S. PATENT DOCUMENTS

| | | | |
|---|---|---|---|
| 3,409,563 | 11/1968 | Olstowski | 252/506 |
| 3,933,688 | 1/1976 | Dines | 252/518 |
| 3,956,194 | 5/1976 | Armand | 252/506 |
| 3,962,133 | 6/1976 | Rodewald | 252/429 R |
| 4,086,229 | 4/1978 | Hughes | 260/429 R |
| 4,094,893 | 6/1978 | Dines | 260/429 R |
| 4,237,061 | 12/1980 | Johnson | 260/429 R |
| 4,293,450 | 10/1981 | Vogel | 252/506 |
| 4,414,142 | 11/1983 | Vogel et al. | 252/506 |

OTHER PUBLICATIONS

"Graphite Intercalation Compounds" in *Adv. Inorganic Chem. Radiochem*, vol. 23, pp. 281–327, (1980).

*Primary Examiner*—Josephine L. Barr
*Attorney, Agent, or Firm*—Armstrong, Nikaido, Marmelstein & Kubovcik

[57] ABSTRACT

A novel ternary intercalation compound of a graphite with an alkali metal fluoride and fluorine, which is represented by the formula $C_xF(MF)_y$ wherein M is an alkali metal is produced by reacting a graphite material with an alkali metal fluoride in an atmosphere of fluorine gas at a temperature of 0° C. to 250° C. for at least a period of time to effect a weight increase in the graphite. The ternary graphite intercalation compound thus obtained has not only an excellent stability to humidity or moisture but also a high electrical conductivity. The novel ternary graphite intercalation compound according to the present invention may be practically used as a novel electrically conductive material and a catalyst of organic reactions.

5 Claims, 5 Drawing Figures

TERNARY INTERCALATION COMPOUND OF A GRAPHITE WITH AN ALKALI METAL FLUORIDE AND FLUORINE, A PROCESS FOR PRODUCING THE SAME, AND AN ELECTRICALLY CONDUCTIVE MATERIAL COMPRISING THE TERNARY INTERCALATION COMPOUND

This invention relates to a novel graphite intercalation compound. More particularly, the present invention is concerned with a ternary intercalation compound of a graphite with an alkali metal fluoride and fluorine which is not only stable to humidity or moisture but also exhibits an excellent electrical conductivity. The present invention is also concerned with a process for producing a ternary intercalation compound of a graphite with an alkali metal fluoride and fluorine. The present invention is further concerned with an electrically conductive material comprising the ternary intercalation compound of a graphite with an alkali metal fluoride and fluorine.

In recent years, attention has increasingly been given to graphite intercalation compounds of fluorides because of their excellent electrical conductivities. However, most of conventionally known graphite intercalation compounds of fluorides are poor in stability to humidity or moisture so that they decompose immediately upon exposure to air and, hence, cannot be put to a practical use. The fluorides hitherto used as intercalants to be intercalated into graphite to form intercalation compounds therewith have low melting and boiling points, that is, they are gaseous or liquid at room temperature. Hence, it is generally accepted that a fluoride to be used as an intercalant should have a high vapor pressure at a relatively low temperature. Therefore, no attempt has been made to produce a graphite intercalation compound of a fluoride having a high melting or boiling point. In fact, it is impossible to prepare a binary intercalation compound of graphite with an alkali metal fluoride which exhibits extremely low vapor pressure at low temperatures.

We have made extensive and intensive investigations with a view to developing a practically useful graphite intercalation compound of a fluoride having not only an excellent electrical conductivity but also an excellent stability to humidity or moisture. As a result, it has been found that a ternary intercalation compound of a graphite with an alkali metal fluoride and fluorine, which is represented by the formula $C_xF(MF)_y$ wherein M is an alkali metal, (hereinafter often referred to simply as "ternary graphite intercalation compound") can be obtained in a yield of 100% relative to the graphite material employed. The ternary graphite intercalation compound thus obtained is excellent not only in stability to humidity or moisture but also in electrical conductivity. The electrical conductivity of the present ternary graphite intercalation compound is higher than that of the raw graphite material employed by one digit. The present invention has been made, based on such novel findings.

Accordingly, it is an object of the present invention to provide a novel ternary graphite intercalation compound which is excellent not only in stability to humidity or moisture but also in electrical conductivity.

It is another object of the present invention to provide a process for the production of such a novel ternary graphite intercalation compound.

It is still another object of the present invention to provide a novel electrically conductive material comprising a novel ternary graphite intercalation compound of the kind described above.

The foregoing and other objects, features and advantages of the present invention will be apparent to those skilled in the art from the following detailed description taken in connection with the accompanying drawings in which.

According to one aspect of the present invention, there is provided a ternary intercalation compound of a graphite with an alkali metal fluoride and fluorine represented by the formula $C_xF(MF)_y$ wherein M is an alkali metal, x is about 2 to about 100 and y is about 0.001 to about 0.80.

In general, the ternary graphite intercalation compound represented by the formula $C_xF(MF)_y$ wherein M, x and y are as defined above can be produced by reacting a graphite material with an alkali metal fluoride in an atmosphere of fluorine gas at a temperature of 0° C. to 250° C. for at least a period of time to effect a weight increase in the graphite.

The present invention will now be described in detail.

In the present invention, the alkali metal represented by M is Li, Na, K, Rb, Cs or Fr. Generally, in the ternary graphite intercalation compound of the formula $C_xF(MF)_y$, x is about 2 to about 100 and y is about 0.001 to about 0.80. The ternary graphite intercalation compounds of the formula $C_xF(MF)_y$ according to the present invention include 1st stage, 2nd stage, 3rd stage, 4th stage, 5th stage, 6th stage, 7th stage and sometimes 8th or higher stage compounds and mixed stage compounds thereof. The stage number of the ternary graphite intercalation compound can be determined by the measurement of the identity period (Ic) obtained by X-ray diffraction. The stage number of the formed ternary graphite intercalation compound depends not only on the reaction temperature and time, but also on the crystallinity and thickness (c-axis direction) of a graphite material. The values of x and y vary according to the stage number of the ternary graphite intercalation compounds. For the 1st stage compound, the value of x ranges from about 2.0 to about 20 and the value of y ranges from about 0.02 to about 0.80. For the 2nd stage compound, the value of x ranges from about 5 to about 50 and the value of y ranges from about 0.01 to about 0.50. For the 3rd or higher stage compound, the value of x ranges from about 20 to about 100 and the value of y ranges from about 0.001 to about 0.30. With respect to each of the 1st stage, 2nd stage and 3rd stage or higher stage compounds, the values of x and y vary, within the above-mentioned range of each case, not only depending on the reaction temperature and time, but also depending on the crystallinity and c-axial thickness of a graphite material.

The graphite material to be used for the production of a ternary graphite intercalation compound according to the present invention may be any of a natural graphite and a artificial graphite which can be obtained by subjecting petroleum coke or the like to heat treatment. The size of the graphite material is not critical. There may be employed a flaky (generally, about 10 to about 80 mesh, Tyler) or powdery graphite (generally, not less than about 80 to about 400 mesh, Tyler). Meanwhile, in case a block-shaped graphite is desired, there may be used a material which can be obtained by a process which comprises contacting a hydrocarbon such as methane, propane, benzene and/or acetylene with a substrate (generally, made of an artificial graphite) heated at approximately 2,100° C. to pyrolyze the hydrocarbon and to deposit the resulting graphite material on the substrate, and subjecting the deposited graphite material to heat treatment. Block-shaped graphites having different graphitization degrees are obtained according to the heat-treatment temperature. When the heat treatment is effected at about 2,400° C., there is obtained a pyrolytic carbon. When the heat treatment is effected at about 2,600° C. to 3,000° C., there is obtained a pyrolytic graphite having a high crystallinity as compared with that of a pyrolytic carbon.

A ternary graphite intercalation compound of the formula $C_xF(MF)_y$ (wherein M stands for an alkali metal, x is about 2 to about 100 and y is about 0.001 to about 0.80) can be obtained by reacting a graphite material with an alkali metal fluoride in an atmosphere of fluorine gas at a temperature of 0° C. to 250° C. for at least a time to effect a weight increase in the graphite. The above-mentioned reaction may be performed in various ways, which are not limited to the following ways. For example, there may be employed a process similar to the process which is known as "dual furnace process" [J. Phys, D 1, 291 (1968)]. In this process similar to the dual furnace process, a graphite material and an alkali metal fluoride are placed apart from each other in a reactor with a net placed therebetween and the graphite material is caused to react with the alkali metal fluoride in an atmosphere of fluorine gas to obtain a desired ternary graphite intercalation compound. This process is advantageous in that troublesom procedures to separate the resulting ternary graphite intercalation compounds from the alkali metal fluoride remaining unreacted are not required. As another example of the ways to carry out the above-mentioned reaction, there may be employed a process in which a graphite material is contacted with an alkali metal fluoride in an atmosphere of fluorine gas. In this case, the alkali metal fluoride remaining unreacted is separated by means of a sieve or a pincette to obtain the desired ternary graphite intercalation compound.

Following are the desirable reaction conditions in producing a ternary graphite intercalation compound of the formula $C_xF(MF)_y$ (wherein M stands for an alkali metal, x is about 2 to about 100 and y is about 0.001 to 0.80) by reacting a graphite material with an alkali metal fluoride in an atmosphere of fluorine gas at a temperature of 0° C. to 250° C. for at least a period of time to effect a weight increase in the graphite. The fluorine gas pressure is not critical, but may usually be 0.5 to 10 atm. The reaction temperature is 0° to 250° C., preferably 0 to 200° C. As described before, to obtain the composition of the formula $C_xF(MF)_y$ having desired values of x and y, the reaction time depends on the crystallinity and c-axial thickness of a graphite material and the reaction temperature. But, the reaction time generally is 30 minutes to 10 days and more usually 1 hour to 7 days. The weight amount ratio of a graphite material to an alkali metal fluoride depends on the desired stage number of the ternary graphite intercalation compound, but generally is 1:0.01 to 1:50. With respect to the reaction conditions, it is noted that when the temperature of the reaction system is elevated to a temperature higher than 100° C., a weight increase in the graphite is observed during the course of cooling of the once heated reaction system at the time when the temperature becomes below 100° C. When the c-axial thickness of a graphite material is more than 1 mm, the product tends to be of the 2nd stage or higher stage rather than of the 1st stage. In order to obtain the 1st stage compound, it is generally preferred to employ a graphite material having a thickness (c-axis direction) of up to 0.8 mm.

After completion of the reaction, if the temperature of the reaction system has been elevated to a temperature higher than room temperature, the reaction system is cooled to room temperature to obtain the desired ternary graphite intercalation compound of the formula $C_xF(MF)_y$.

In the case where M is Li in the formula $C_xF(MF)_y$, the indentity periods (Ic) of $C_xF(MF)_y$ are about 9.3 to 9.5 Å, about 12.7 to 12.9 Å, about 16.0 to 16.2 Å, about 19.4 to 19.6 Å, about 22.7 to 22.9 Å, about 26.1 to 26.3 Å, about 29.4 to 29.6 Å and about 32.8 to 33.0 Å for the 1st, 2nd, 3rd, 4th, 5th, 6th, 7th and 8th stage compounds, respectively. Generally, the identity periods (Ic) of $C_xF(MF)_y$ for each of the 1st stage, 2nd stage, 3rd stage, 4th stage, 5th stage, 6th stage, 7th stage and 8th stage compounds slightly vary depending on the kind of the alkali metal M in the formula $C_xF(MF)_y$. The ternary graphite intercalation compounds of the present invention, in general, are black in color. All the ternary graphite intercalation compounds of the formula $C_xF(MF)_y$ wherein M is an alkali metal according to the present invention are very stable so that, even after exposure to air for several weeks or immersion in water overnight, any changes are hardly observed in the X-ray diffraction patterns.

The results of elementary analysis and X-ray diffraction of some forms of the present ternary graphite intercalation compounds of the formula $C_xF(MF)_y$ are shown in Table 1.

TABLE 1

| Compound | Elementary analysis (%) | X-ray diffraction data (Cu—$K_\alpha$) | | | |
|---|---|---|---|---|---|
| | | 2θ(°) | d(Å) | (00l) | Ic(Å) |
| $C_{13}F(LiF)_{0.4}$ black | C: 83.7 | 9.3 | 9.5 | 001 | 9.33 ± 0.10 |
| | | 19.22 | 4.61 | 002 | |
| | F: 14.7 | 28.38 | 3.14 | 003 | |
| | | 49.0 | 1.9 | 005 | |
| | Li: 1.6 | 58.94 | 1.57 | 006 | |
| $C_{14}F(LiF)_{0.5}$ black | C: 84.4 | 8.6 | 10.3 | 001 | about 9.4 |
| | | 19.88 | 4.46 | 002 | |
| | F: 14.0 | 28.26 | 3.16 | 003 | |
| | | 49.5 | 1.8 | 005 | |
| | Li: 1.6 | 58.62 | 1.57 | 006 | |
| $C_{16}F(LiF)_{0.8}$ | C: 83.2 | 9.4 | 9.4 | 001 | 9.38 ± 0.06 |

TABLE 1-continued

| Compound | Elementary analysis (%) | X-ray diffraction data (Cu—K$_\alpha$) | | | |
|---|---|---|---|---|---|
| | | $2\theta(°)$ | d(Å) | (00l) | Ic(Å) |
| black | | 19.02 | 4.66 | 002 | |
| | F: 14.5 | 28.36 | 3.14 | 003 | |
| | | 48.3 | 1.9 | 005 | |
| | Li: 2.3 | 58.82 | 1.57 | 006 | |
| $C_{13}F(LiF)_{0.20}$ black | C: 86.3 | 9.32 | 9.48 | 001 | 9.32 ± 0.09 |
| | | 19.22 | 4.61 | 002 | |
| | F: 12.9 | 28.44 | 3.14 | 003 | |
| | Li: 0.8 | 48.92 | 1.83 | 005 | |
| | | 58.96 | 1.57 | 006 | |
| $C_{10}F(NaF)_{0.15}$ black | C: 83.0 | 10.0 | 8.84 | 001 | about 9.55 |
| | | 18.82 | 4.71 | 002 | |
| | F: 14.7 | 28.0 | 3.18 | 003 | |
| | | 48.0 | 1.89 | 005 | |
| | Na: 2.3 | 58.7 | 1.57 | 006 | |
| $C_8F(KF)_{0.09}$ black | C: 80.1 | 9.62 | 9.19 | 001 | about 9.45 |
| | | 18.90 | 4.69 | 002 | |
| | F: 17.0 | 28.30 | 3.15 | 003 | |
| | | 48.25 | 1.88 | 005 | |
| | K: 2.9 | 59.0 | 1.56 | 006 | |
| $C_{9.3}F(CsF)_{0.05}$ black | C: 81.1 | 9.38 | 9.42 | 001 | about 9.55 |
| | | 18.90 | 4.69 | 002 | |
| | F: 14.4 | 28.0 | 3.18 | 003 | |
| | | 47.6 | 1.91 | 005 | |
| | Cs: 4.5 | 59.0 | 1.56 | 006 | |

In the elementary analysis, the carbon contents of the ternary graphite intercalation compounds were determined using Yanagimoto High Speed CHN coder MT-2 (an apparatus manufactured and sold by Yanagimoto Seisakusho, Japan). The fluorine contents of the ternary graphite intercalation compounds were determined by the oxygen flask combustion method. With respect to the elementary analysis of the ternary graphite intercalation compounds containing Li, the amount of fluorine attributed to lithium fluoride in the ternary graphite intercalation compound cannot be sufficiently detected by the oxygen flask combustion method because of poor solubility of lithium fluoride in water. Therefore, the fluorine contents of the ternary graphite intercalation compounds containing Li are obtained by means of a correction factor which has been obtained by carrying out an experiment in which a standard lithium fluoride sample is analyzed by the oxygen flask combustion method and the found value of fluorine content and the caluculated value of fluorine content are compared. With respect to the elementary analysis of the other ternary intercalation compounds, such corrections are not needed. The analysis of alkali metals can be made by the atomic absorption method.

Figure 1:
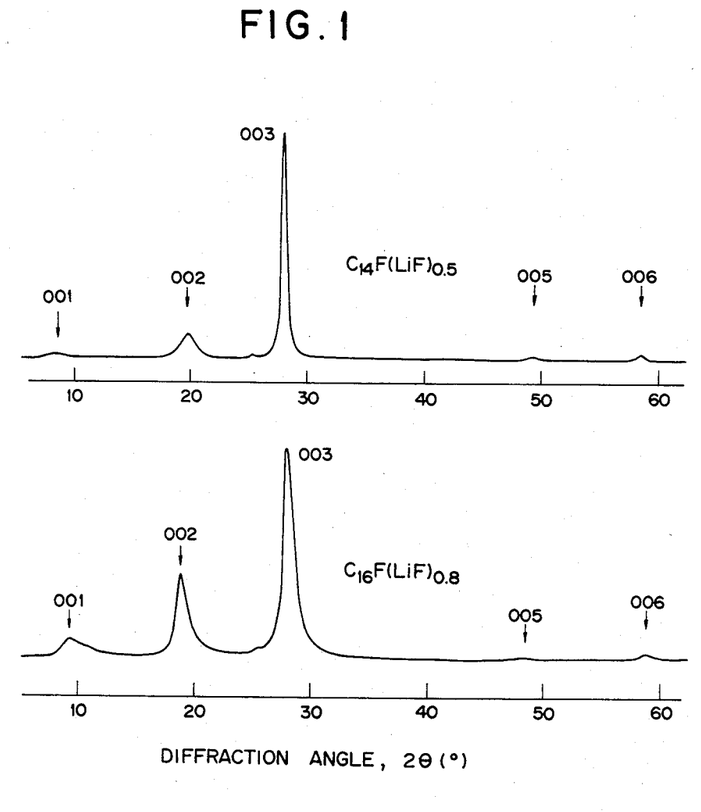
FIG. 1 shows X-ray diffraction patterns of $C_{14}F(LiF)_{0.5}$ and $C_{16}F(LiF)_{0.8}$ which are two forms of the ternary graphite intercalation compounds according to the present invention.
Figure 4:
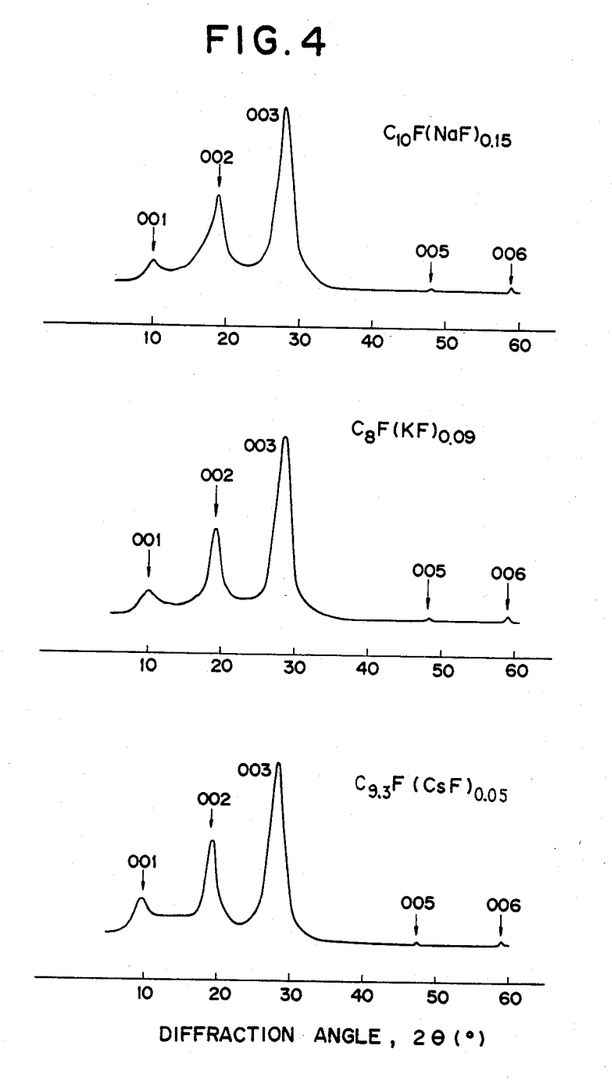
FIG. 4 shows X-ray diffraction patterns of $C_{10}F(NaF)_{0.15}$, $C_8F(KF)_{0.09}$ and $C_{9.3}F(CsF)_{0.05}$ which are further forms of the ternary graphite intercalation compounds according to the present invention.
Figure 5:
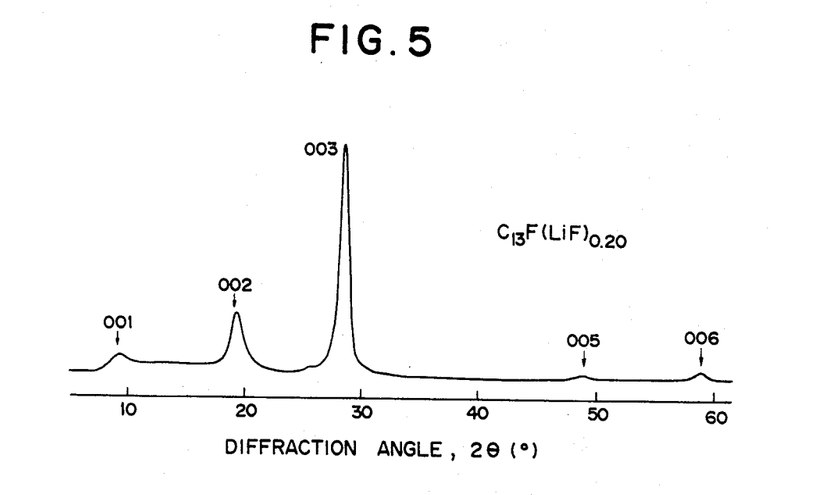
FIG. 5 shows X-ray diffraction patterns of $C_{13}F(LiF)_{0.20}$ which is a still further form of the ternary graphite intercalation compounds according to the present invention.

In FIGS. 1, 4 and 5, there are shown X-ray diffraction patterns (Cu-K$\alpha$) of $C_{14}F(LiF)_{0.5}$, $C_{16}F(LiF)_{0.8}$, $C_{10}F(NaF)_{0.15}$, $C_8F(KF)_{0.09}$, $C_{9.3}F(CsF)_{0.05}$ and $C_{13}F(LiF)_{0.20}$. In the X-ray study of such ternary graphite intercalation compounds, broad diffraction lines are sometimes observed. The identity periods (Ic) of five kinds of $C_xF(MF)_y$ shown in FIGS. 1, 4 and 5 are calculated from the (00l) diffraction lines to give about 9.4 Å, about 9.38 Å, about 9.55 Å, about 9.45 Å, about 9.55 Å and about 9.32 Å, respectively.

Figure 2:
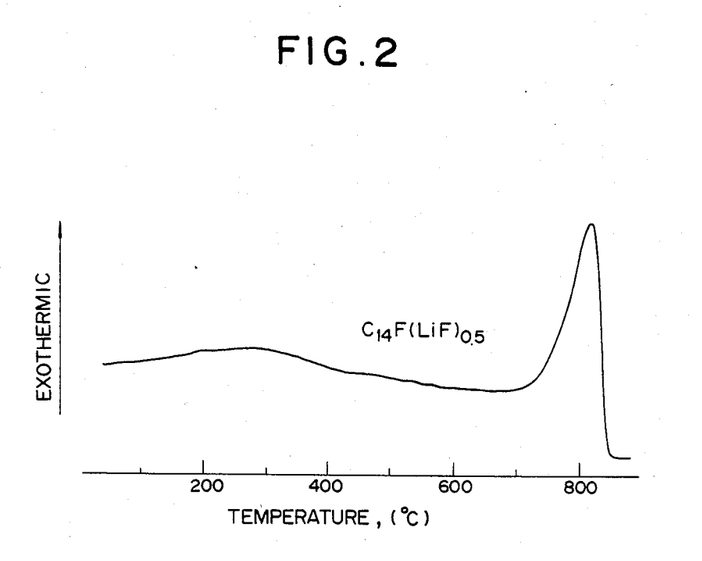
FIG. 2 shows a DTA(differential thermal analysis) curve of $C_{14}F(LiF)_{0.5}$ which is one form of the ternary graphite intercalation compounds according to the present invention.

In FIG. 2, there is shown a DTA curve (as measured in air, with a heating rate of 20° C./min) of $C_{14}F(LiF)_0$. In FIG. 2, the exothermic broad peak for $C_{14}F(LiF)_{0.5}$ first starts at about 50° C. and it is confirmed that the summit of the broad peak is located at about 270° C.

Figure 3:
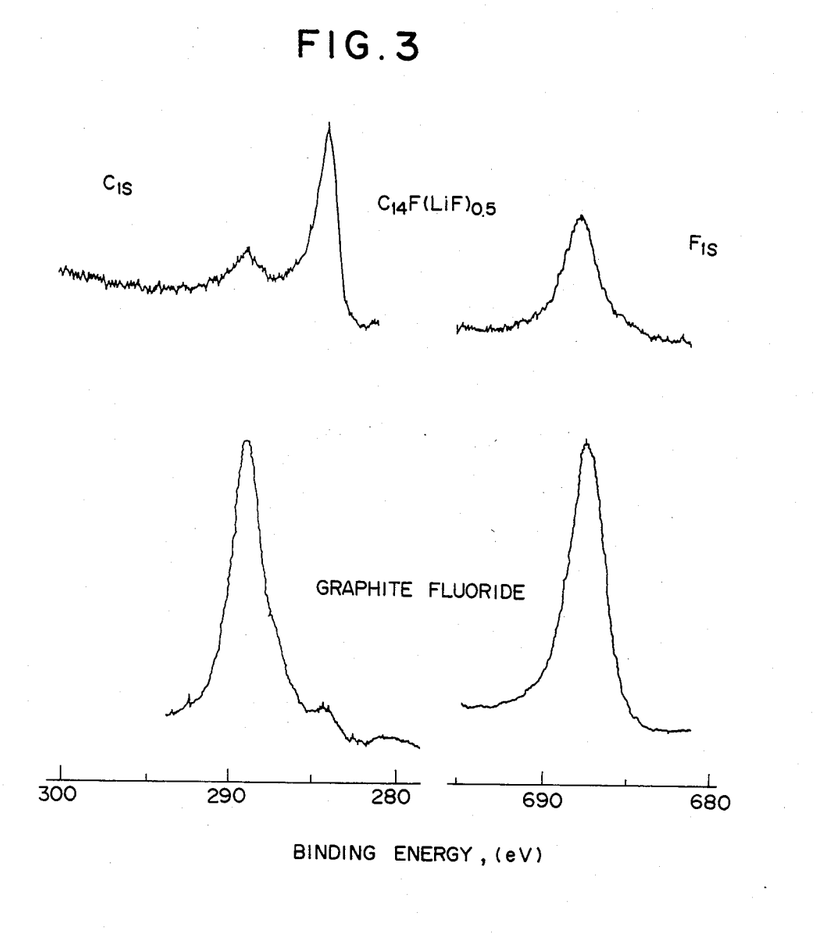
FIG. 3 shows ESCA(electron spectroscopy for chemical analysis) spectra of $C_{14}F(LiF)_{0.5}$ which is one form of the ternary graphite intercalation compounds according to the present invention, shown in comparison with those of a graphite fluoride.

ESCA is one of the most useful means to give valuable information concerning a chemical bond between the host graphite and the intercalant. In FIG. 3, there are shown ESCA spectra of the 1st stage compound [$C_{14}F(LiF)_{0.5}$], shown in comparison with that of a graphite fluoride composed of 59% by weight of $(C_2F)_n$ and the balance of $(CF)_n$. A $(C_2F)_n$ type graphite fluoride has two carbon 1s peaks at 289.0 eV and 287.0 eV as compared with contamination carbon 1s peak located at 284.0 eV. The $C_{ls}$ peak at 289.0 eV is attributed to C-F bonds and that appearing at 287.0 eV is attributed to C-C bonds adjacent to C-F bonds. Since a $(CF)_n$ type graphite fluoride has only C-F covalent bonds, the ESCA spectrum has also only one $C_{ls}$ peak at 289.0 eV. With respect to $C_{14}F(LiF)_{0.5}$, a strong peak at 284.0 eV and another peak at 288.7 eV are observed. The latter suggests the presence of fluorine atoms chemically adsorbed and covalently bonded to the carbon atoms of the host graphite. The $F_{ls}$ spectrum also gives a rather broad peak at 687.8 eV. In the ESCA study, a kinetic energy of photoelectron emitted from an inner shell of each element is measured. Since the mean free path of photoelectron is at most several ten angstroms in solid materials, only several graphite layers are analyzed in graphite intercalation compounds. Accordingly, the chemical bond around the surface of the compound is emphasized in ESCA spectra. With respect to $C_{14}F(LiF)_{0.5}$, the peak attributed to C-F bonds is small, suggesting that there are scarcely any C-F bonds around the surface of $C_{14}F(LiF)_{0.5}$.

With respect to the formation of the ternary graphite intercalation compound of the formula $C_xF(MF)_y$ (wherein M is an alkali metal), it is believed to be as follows. Gaseous species $(MF)_m\cdot(F_2)_n$ (wherein M is an alkali metal) is first formed by the reaction of MF with fluorine according to the following formula:

$$mMF + nF_2 \rightleftharpoons (MF)_m\cdot(F_2)_n$$

The gaseous species is then intercalated into graphite. Since these chemical equilibriums move to the left with elevation in temperature, gaseous complexes will be decomposed at high temperatures.

As described before, even after the ternary graphite intercalation compound according to the present invention is exposed to air for several weeks, the analysis of the exposed compound by means of X-ray diffractometry exhibits substantially the same X-ray diffraction pattern as that of the unexposed compound. The ternary graphite intercalation compound according to the present invention is stable to humidity or moisture as different from the conventionally known graphite-fluoride intercalation compounds which decompose immediately when they are exposed to air.

Next, an explanation will be given on the electrical conductivities in the direction of a-axis (parallel to graphite layers) of the ternary graphite intercalation compounds according to the present invention. It is generally known to those skilled in the art that there is substantially no difference in electrical conductivity between a 2nd stage compound and a 3rd stage compound and that the 2nd stage compound and the 3rd stage compound have excellent electrical conductivity as compared with other stage compounds [see D. Billand, A. Herold and F. Vogel, SYNTHETIC METALS, 3 (1981) 279-288]. A-axis specific resistances were measured of pyrolytic graphite (manufactured and sold by Nippon Carbon Co. Ltd., Japan) and $C_{27}F(LiF)_{0.5}$ (mixed stage compound of 2nd stage, 4th stage and 6th stage), $C_{18}F(LiF)_{0.5}$ (mixed stage compound of 3rd stage and 8th stage compound) and $C_{14}F(LiF)_{0.5}$ (1st stage compound) according to the non-contact method as described in Synthetic Metals, 3, 247 (1981).

The results are shown in Table 2.

TABLE 2

| Compound | Specific resistance, $\Omega \cdot cm$ at 25° C. |
|---|---|
| Pyrolytic graphite | $6.0 \times 10^{-5}$ |
| $C_{27}F(LiF)_{0.5}$ | $5.0 \times 10^{-6}$ |
| $C_{18}F(LiF)_{0.5}$ | $5.0 \times 10^{-6}$ |
| $C_{14}F(LiF)_{0.5}$ | $8.3 \times 10^{-6}$ |

As shown in Table 2, the specific resistance of each of $C_{27}F(LiF)_{0.5}$, $C_{18}F(LiF)_{0.5}$ and $C_{14}F(LiF)_{0.5}$ is lower than that of the original pyrolytic graphite by one digit. The ternary graphite intercalation compound according to the present invention has not only an excellent stability to humidity or moisture but also a high electrical conductivity. The ternary graphite intercalation compound according to the present invention can be sheathed by a copper foil or incorporated into an epoxy resin so that it can be used as an electrically conductive material. The ternary graphite intercalation compound according to the present invention is useful not only as an electrically conductive material but also as a catalyst for various organic reactions.

The present invention will be illustrated in more detail with reference to the following Examples, which should not be construed to be limiting the scope of the present invention.

EXAMPLE 1

In a reactor made of nickel were charged 0.305 g of flaky natural graphite having a size of 20 to 48 mesh (Tyler) from Madagascar ore and 0.307 g of commercially available LiF (special grade) with a nickel-made net placed therebetween, and the reactor was then placed in a fluorinating apparatus. After evacuation to vacuum, fluorine gas was introduced into the fluorinating apparatus to 1 atm at a temperature of 230° C. and the reaction system was allowed to stand at that temperature for 7 days. Then the fluorinating apparatus was cooled to room temperature and kept at room temperature. The total of the cooling time and the period of time for which the apparatus was kept at room temperature was two hours. Then the fluorine gas in the apparatus was replaced by nitrogen gas to obtain a black intercalation compound of the formula $C_{13}F(LiF)_{0.4}$. The results of elementary analysis and X-ray diffraction of $C_{13}F(LiF)_{0.4}$ are shown in Table 1 as given above.

EXAMPLE 2

In a reactor made of nickel were charged 0.307 g of flaky natural graphite having a size of 20 to 48 mesh (Tyler) from Madagascar ore and 0.300 g of commercially available LiF (special grade), with a nickel-made net placed therebetween, and the reactor was then placed in a fluorinating apparatus. After evacuation to vacuum, fluorine gas was introduced into the fluorinating apparatus to 1 atm at a temperature of 200° C., and the reaction system was allowed to stand at that temperature for two days. Then the fluorinating apparatus was cooled to room temperature and kept at room temperature. The total of the cooling time and the period of time for which the apparatus was kept at room temperature was two hours. Then the fluorine gas in the apparatus was replaced by nitrogen gas to obtain a black intercalation compound of the formula $C_{14}F(LiF)_{0.5}$. The results of elementary analysis and X-ray diffraction of $C_{14}F(LiF)_{0.5}$ are shown in Table 1 as given above.

EXAMPLE 3

In a reactor made of nickel were charged 0.300 g of flaky natural graphite having a size of 20 to 48 mesh (Tyler) from Madagascar ore and 0.302 g of commercially available LiF (special grade), with a nickel-made net placed therebetween, and the reactor was then placed in a fluorinating apparatus. After evacuation to vacuum, fluorine gas was introduced into the fluorinating apparatus to 1 atm at a temperature of 190° C., and the reaction system was allowed to stand at that temperature for 63 hours. Then the fluorinating apparatus was cooled to room temperature and kept at room temperature. The total of the cooling time and the period of time for which the apparatus was kept at room temperature was two hours. Then the fluorine gas in the apparatus was replaced by nitrogen gas to obtain a black intercalation compound of the formula $C_{16}F(LiF)_{0.8}$. The results of elementary analysis and X-ray diffraction of $C_{16}F(LiF)_{0.8}$ are shown in Table 1 as given above.

EXAMPLE 4

In a reactor made of nickel were charged 2.00 g of flaky natural graphite having a size of 80 mesh or more (Tyler) from Madagascar ore and 0.500 g of commercially available NaF, with a nickel-made net placed therebetween, and the reactor was then placed in a fluorinating apparatus. After evacuation to vacuum, fluorine gas was introduced into the fluorinating apparatus to 1 atm at a temperature of 160° C., and the reaction system was allowed to stand at that temperature for 68 hours. Then the fluorinating apparatus was cooled to room temperature and kept at room temperature. The total of the cooling time and the period of time for which the apparatus was kept at room temperature was 24 hours. Then the fluorine gas in the apparatus was replaced by nitrogen gas to obtain an intercalation compound of the formula $C_{10}F(NaF)_{0.15}$. The results of elementary analysis and X-ray diffraction of $C_{10}F(NaF)_{0.15}$ are shown in Table 1 as given above.

EXAMPLE 5

In a reactor made of nickel were charged 2.00 g of flaky natural graphite having a size of 80 mesh or more (Tyler) from Madagascar ore and 0.5 g of commercially available KF, with a nickel-made net placed therebetween, and the reactor was then placed in a fluorinating apparatus. After evacuation to vacuum, fluorine gas was introduced into the fluorinating apparatus to 1 atm at a temperature of 140° C., and the reaction system was allowed to stand at that temperature for 64 hours. Then the fluorinating apparatus was cooled to room temperature and kept at room temperature. The total of the cooling time and the period of time for which the apparatus was kept at room temperature was 24 hours. Then the fluorine gas in the apparatus was replaced by nitrogen gas to obtain a ternary graphite intercalation compound of the formula $C_8F(KF)_{0.09}$. The results of elementary analysis and X-ray diffraction of $C_8F(KF)_{0.09}$ are shown in Table 1 as given above.

EXAMPLE 6

In a reactor made of nickel were charged 2.00 g of flaky natural graphite having a size of 80 mesh or more (Tyler) from Madagascar ore and 0.5 g of commercially available CsF, with a nickel-made net placed therebetween and the reactor was then placed in a fluorinating apparatus. After evacuation to vacuum, fluorine gas was introduced into the fluorinating apparatus to 1 atm at a temperature of 140° C., and the reaction system was allowed to stand at that temperature for 48 hours. Then the fluorinating apparatus was cooled to room temperature and kept at room temperature. The total of the cooling time and the period of time for which the apparatus was kept at room temperature was 24 hours. Then the fluorine gas in the apparatus was replaced by nitrogen gas to obtain a ternary graphite intercalation compound of the formula $C_{9.3}F(CsF)_{0.05}$. The results of elementary analysis and X-ray diffraction of $C_{9.3}F(CsF)_{0.05}$ are shown in Table 1 as given above.

EXAMPLE 7

In a reactor made of nickel was charged a mixture of 100 mg of flaky natural graphite having a size of 20 to 48 mesh (Tyler) from Madagascar ore and 200 mg of commercially available LiF, and the reactor was then placed in a fluorinating apparatus. After evacuation to vacuum, fluorine gas was introduced into the fluorinating apparatus to 1 atm at a temperature of 148° C., and the reaction system was allowed to stand at that temperature for 24 hours. Then the fluorinating apparatus was cooled to room temperature and kept at room temperature. The total of the cooling time and the period of time for which the apparatus was kept at room temperature was 5 hours. Then the fluorine gas in the apparatus was replaced by nitrogen gas to obtain a ternary graphite intercalation compound of the formula $C_{13}F(LiF)_{0.20}$. The results of elementary analysis and X-ray diffraction of $C_{13}F(LiF)_{0.20}$ are shown in Table 1 as given above.

EXAMPLE 8

In a reactor made of nickel was charged a mixture of 2.00 g of flaky natural graphite having a size of 80 mesh or more (Tyler) from Madagascar ore and 0.500 g of commercially available NaF, and the reactor was then placed in a fluorinating apparatus. After evacuation to vacuum, fluorine gas was introduced into the fluorinating apparatus to 1 atm at a temperature of 160° C., and the reaction system was allowed to stand at that temperature for 87 hours. Then the fluorinating apparatus was cooled to room temperature and kept at room temperature. The total of the cooling time and the period of time for which the apparatus was kept at room temperature was 192 hours. Then the fluorine gas in the apparatus was replaced by nitrogen gas to obtain a ternary intercalation compound of a graphite with sodium fluoride and fluorine. The results of X-ray diffraction of the obtained compound are as follows.

TABLE 3

| 2θ(°) | d(Å) | (001) | Ic(Å) |
|---|---|---|---|
| 9.7 | 9.11 | 001 | about 9.48 |
| 19.0 | 4.67 | 002 | |
| 28.2 | 3.16 | 003 | |
| 47.0 | 1.93 | 005 | |
| 58.7 | 1.57 | 006 | |

X-ray diffraction data (Cu—Kα)

In the meantime, the ESCA studies described herein were conducted using a Du Pont 650 B Electron Spectrometer with Mg-Kα radiation. The DTA was carried out in air using α-$Al_2O_3$ as a reference. The X-diffraction studies were carried out using X-ray diffraction apparatus JDX-8 F (an apparatus manufactured and sold by JEOL, Ltd., Japan) with Cu-Kα radiation.

It is clearly understood from the above examples that according to the present invention there are provided novel ternary intercalation compounds of the formula $C_xF(MF)_y$ (wherein M is an alkali metal) having excellent characteristics and a preparation method thereof. But, further features and advantages of the present invention are apparent from many experimental data given in the detailed description given before.

What is claimed is:

1. A ternary intercalation compound of a graphite with an alkali metal fluoride and fluorine represented by the formula $C_xF(MF)_y$ wherein M is an alkali metal selected from the group consisting of Li, Na, K, Rb and Cs, x is about 2 to about 100 and y is about 0.001 to about 0.80.

2. A ternary intercalation compound according to claim 1, wherein said ternary intercalation compound of a graphite with an alkali metal fluoride and fluorine is a mixed stage compound comprising at least two members selected from the group consisting of a 1st stage compound, a 2nd stage compound, a 3rd stage compound, a 4th stage compound, a 5th stage compound, a 6th stage compound, a 7th stage compound and a 8th stage compound.

3. A process for producing a ternary intercalation compound of a graphite with an alkali metal fluoride and fluorine represented by the formula $C_xF(MF)_y$ wherein M is an alkali metal selected from the group consisting of Li, Na, K, Rb and Cs, x is about 2 to about 100 and y is about 0.001 to about 0.80, which comprises reacting a graphite material with an alkali metal fluoride selected from the group consisting of LiF, NaF, KF, RbF and CsF under a fluorine gas pressure of 0.5 to 10 atm at a temperature of 0° C. to 250° C. for at least a period of time to effect a weight increase in the graphite, the graphite material and the alkali metal fluoride being employed in a weight ratio of 1:0.01 to 1:50.

4. A process according to claim 3, wherein the temperature is 0° to 200° C.

5. An electrically conductive material comprising a ternary intercalation compound of a graphite with an alkali metal fluoride and fluorine represented by the formula $C_xF(MF)_y$ wherein M is an alkali metal selected from the group consisting of Li, Na, K, Rb and Cs, x is about 2 to about 100 and y is about 0.001 to about 0.80.

* * * * *